(12) United States Patent
Noble et al.

(10) Patent No.: US 7,293,418 B2
(45) Date of Patent: Nov. 13, 2007

(54) METHOD AND APPARATUS FOR DELIVERING A HIGH PRESSURE GAS FROM A CRYOGENIC STORAGE TANK

(75) Inventors: Stephen D. Noble, West Vancouver (CA); Thomas C. Brook, Shawnigan Lake (CA); Lance G. Follett, Surrey (CA); Gregory C. Harper, Vancouver (CA)

(73) Assignee: Westport Power Inc., Vancouver, B.C. (CA)

( * ) Notice: Subject to any disclaimer, the term of this patent is extended or adjusted under 35 U.S.C. 154(b) by 312 days.

(21) Appl. No.: 10/497,256

(22) PCT Filed: Nov. 27, 2002

(86) PCT No.: PCT/CA02/01828

§ 371 (c)(1),
(2), (4) Date: Sep. 20, 2004

(87) PCT Pub. No.: WO03/046432

PCT Pub. Date: Jun. 5, 2003

(65) Prior Publication Data

US 2005/0086949 A1    Apr. 28, 2005

(30) Foreign Application Priority Data

Nov. 30, 2001   (CA) .................................. 2362844

(51) Int. Cl.
*F17C 13/00*     (2006.01)
*F17C 7/02*      (2006.01)
*F17C 9/02*      (2006.01)

(52) U.S. Cl. ........................... 62/50.6; 62/50.1; 62/50.2

(58) Field of Classification Search ................ 62/50.6, 62/50.1, 50.2; 417/901
See application file for complete search history.

(56) References Cited

U.S. PATENT DOCUMENTS

| | | | | |
|---|---|---|---|---|
| 1,878,317 A | * | 9/1932 | Picard | 62/50.2 |
| 2,500,320 A | * | 3/1950 | Peff | 62/50.2 |
| 2,526,221 A | * | 10/1950 | Goddard | 222/399 |
| 2,532,710 A | * | 12/1950 | Goddard | 165/278 |
| 3,016,717 A | | 1/1962 | Gottzmann | |
| 3,082,690 A | * | 3/1963 | Reynolds et al. | 102/313 |
| 3,119,238 A | | 1/1964 | Chamberlain et al. | |
| 3,251,602 A | | 5/1966 | Williams et al. | |
| 3,341,215 A | | 9/1967 | Spector | |
| 3,698,200 A | | 10/1972 | Johnson et al. | |
| 4,406,129 A | | 9/1983 | Mills | |
| 4,689,064 A | | 8/1987 | Boulanger et al. | |
| 4,705,189 A | | 11/1987 | Theissen et al. | |
| 4,718,239 A | | 1/1988 | Nowobilski et al. | |
| 4,738,115 A | | 4/1988 | Goode | |
| 4,932,214 A | * | 6/1990 | Nieratscher et al. | 62/50.6 |
| 5,163,409 A | | 11/1992 | Gustafson et al. | |
| 5,188,519 A | | 2/1993 | Spulgis | |

(Continued)

*Primary Examiner*—William C Doerrler
(74) *Attorney, Agent, or Firm*—McAndrews, Held & Malloy, Ltd.

(57) ABSTRACT

A cryogenic tank assembly has a pump which discharges into an accumulator which is located in the cryogenic storage area. This reduces the space required for the device as well as the functioning of the device. The high pressure fluid in the accumulator remains at a cryogenic temperature. The system may also include a heater to deliver high pressure gas form the liquid storage volume.

77 Claims, 10 Drawing Sheets

U.S. PATENT DOCUMENTS

| | | |
|---|---|---|
| 5,327,730 A | 7/1994 | Myers et al. |
| 5,438,837 A | 8/1995 | Caldwell et al. |
| 5,477,690 A | 12/1995 | Gram |
| 5,651,473 A | 7/1997 | Preston et al. |
| 5,655,578 A | 8/1997 | Farkas |
| 5,678,411 A * | 10/1997 | Matsumura et al. ......... 62/50.3 |
| 5,682,750 A * | 11/1997 | Preston et al. ............... 62/50.2 |
| 5,819,544 A * | 10/1998 | Andonian ................... 62/50.6 |
| 5,884,488 A | 3/1999 | Gram et al. |
| 5,937,655 A | 8/1999 | Weiler et al. |
| 5,971,727 A | 10/1999 | Horan et al. |
| 6,029,456 A | 2/2000 | Zaiser |
| 6,134,893 A | 10/2000 | Bonn |
| 6,196,280 B1 | 3/2001 | Tate, Jr. et al. |

* cited by examiner

METHOD AND APPARATUS FOR DELIVERING A HIGH PRESSURE GAS FROM A CRYOGENIC STORAGE TANK

FIELD OF THE INVENTION

This invention relates to a gas delivery system.

BACKGROUND OF THE INVENTION

Developments in combustion engine technology have shown that compression ignition engines, known as diesel-cycle engines, may be fueled by gaseous fuels without sacrifices in performance or efficiency. Examples of such fuels include natural gas, methane, propane, ethane, gaseous combustible hydrocarbon derivatives such as methanol and hydrogen. Substituting diesel with such gaseous fuels generally results in cost, availability and emissions benefits over diesel. These developments, however, require such gaseous fuels to be delivered to the engine for combustion at high pressures.

Such prior art high pressure gas delivery systems, however, have been burdened by challenges arising from the need to provide a practical gas fueling system that supplies adequate on-board fuel storage while, at the same time, ensuring that the platform integrating the power generation system, be it stationary power or vehicular power, is not unduly burdened by additional equipment and/or large fuel tanks. The present invention allows, amongst other things, for a fuel delivery system that helps to:

minimize the space required for such a system;
maximize the operating time or range of such gas powered vehicles; and,
deliver a gas at the required operational pressures.

Natural gas and other gaseous fuels can be stored in tanks either as compressed gas (CNG in the case of natural gas), or cryogenically as a liquid (LNG in the case of liquefied natural gas). The present invention is directed to a method and apparatus that utilizes cryogenic storage. By way of example, the energy density of LNG, depending on its comparative pressure and temperature, is approximately three times that of CNG, thereby providing a significant storage advantage over CNG systems. Natural gas stored as LNG allows for more fuel to be stored per unit volume.

Cryogenic liquids are liquids that boil at temperatures below approximately 200K. Such gases include, by way of example, natural gas, nitrogen, methane, hydrogen, helium and oxygen. While, as mentioned above, there are advantages to utilizing LNG and other liquefied gases, cryogenic storage presents its own challenges.

The goal of a fuel delivery system based on cryogenic fuel, is to provide a warm pressurized gaseous fuel to a fuel injector from a cold liquefied store of such fuel. Some prior art systems have accomplished this by pumping cold liquid fuel from a cryogenic tank utilizing a pump physically separate from the tank so as not to burden the cryogenic environment with a heat leak source. The pump elevates the pressure of the fuel and delivers it to a heater where the fuel is heated to a pre-determined temperature suitable for use as a gaseous fuel. Further, where occasions arise in which a pressurized fuel is required to meet a sudden demand that cannot be immediately met by the pump alone, an accumulator may follow the heater thus allowing for a ready supply of fuel to be stored at or near the approximate conditions required for injection as a gaseous fuel into a combustion engine.

One potential goal of utilizing a gaseous fuel is to replace diesel fuel. However, in light of the delivery system described above, a gaseous fuel delivery system would require three more physically separate components than is the case for a similar diesel fuel delivery system, namely, a physically removed pump, accumulator and heater. Moreover, numerous fittings and connectors are required to join together such a fuel system each of which is a potential failure point or leak path compromising the reliability of such a system as a whole.

The subject invention significantly reduces:
the space required for such a fuel system;
the material costs associated with building this system;
the potential failure points within the gas fuel system; and,
the exposed cryogenic components of the fuel delivery system.

One way of dealing with the space and reliability issues arising with a fuel delivery system similar to the one described above is to incorporate a pump or an equivalent pressurizing system into the cryogenic tank. Prior art delivery systems have contemplated such pumps. For example see U.S. Pat. Nos. 4,472,946 and 5,327,730.

A concern with introducing a pump directly into the cryogenic tank is that it may create a potential heat leak thereby reducing the holding time of the liquefied gas, that is, the time prior to which the relief pressure valve opens to vent gas so as to avoid excessive pressures within the tank. Moreover, some prior art fuel delivery systems utilize in-tank centrifugal pumps and vaporizers. Centrifugal pumps, however, work best where relatively low pressure gas must be provided. In diesel-cycle engines, the high pressure direct injection of gaseous fuels requires pressures far in excess of those that can be practically provided by centrifugal cryogenic in-tank pumping systems. Pumping systems utilizing a centrifugal pump are appropriate for transfer pumps and fueling station operations.

A similar problem arises where heating systems are used to provide pressurized gas. Such systems boil gas within the cryogenic tank and release it from its liquefied state in this fuel delivery system at between 15 and 125 psig (103 to 861 kPa). These systems are also unsuitable for high pressure direct injection engines where improved efficiency and emissions can be achieved.

The discussion in this application generally considers a system that provides a pressurized gas from a liquefied store of that gas. However, for the purposes of this application, it will be understood that any references to fluids include liquids as well as liquids pressurized above the supercritical point of the gas of interest. Similarly, any references to gases include gases as they are generally defined as well as gases pressurized above the supercritical point of those gases. More generally, if the desired substance to be delivered is to be delivered at a pressure placing it above the supercritical point of the substance, then that substance generally will also be included in any reference to a gas where corresponding fluid is, at some point in the gas delivery system, at a lower temperature and pressure prior to being delivered.

SUMMARY OF THE INVENTION

The present invention is a cryogenic tank assembly that includes a vessel with a cryogen space capable of storing a cryogenic fluid at an initial pressure. The assembly further includes a pump that has an intake opening so that it can receive a quantity of the cryogenic fluid, pressurize it to a pressure above its storage pressure and deliver it to an accumulator within the cryogen space. The accumulator includes a storage volume to hold the pressurized fluid so that it is available depending on the demands of the end user.

A further embodiment of the invention includes a housing that surrounds the accumulator or that part of the accumulator that is within the cryogen space in the event that a portion of the accumulator lies outside of the cryogen space. The housing extend from and is attached to vessel and helps to support the accumulator and/or the pump within the cryogen space.

A further embodiment of the invention includes a heater that accepts the pressurized fluid from the accumulator and delivers a pressurized gas at a temperature greater than the initial temperature at which the fluid is stored. Some or all of the heater may also be disposed within the cryogen space. Further, some portion or all of the heater may also be placed in the housing noted above along with that percentage of the accumulator in the housing. Where a heater is included, the housing may then be used as a thermal insulator between the accumulator and cryogen space as well as the heater and the cryogen space, if desired. That is, the housing may provide a thermal insulating space between an inner wall and outer wall of the housing. Generally, a thermal insulator may be used to insulate the heater from the cryogen space.

The heater included in the invention may in, in a further embodiment, include a heating substance and at least one channel for housing that heating substance. The heating substance should be capable of warming the cryogenic fluid to convert it from a fluid to a gas as desired. The included heating substance may be a heating fluid capable of being circulated through one or more channels found in the heater. One embodiment of the invention contemplates delivering a fuel from the delivery outlet of the heater for use in an engine as well as utilizing the engine coolant as a heating fluid.

A further embodiment of tank assembly includes a heater with a fluid passageway for directing the fluid from through the channel noted above to a delivery outlet. The fluid passageway may be defined by a pipe.

A further embodiment of the invention includes a cryogenic tank assembly that has an outer jacket surrounding the vessel that provides for a vessel insulation volume between the outer jacket and the vessel. The insulation space may be a vacuum space. Further, that insulation space may be in communication with the insulation space provided by the housing noted above. One possible method of providing this embodiment is to have an inner wall attached to the jacket and an outer wall attached to vessel. Both walls would join at their respective ends in the cryogen space.

A further embodiment may include one or more pipes through the insulation space found in the housing allowing for access between the area outside the jacket and the cryogen space.

A further embodiment of the invention includes one or more reciprocating pumps for delivering the pressurized fluid.

A further embodiment of the invention includes one or more drive units capable of driving the pump. The drive unit may be disposed outside of the cryogen space and may be in communication with the pump via a piston rod running between the drive unit and the pump.

A further embodiment of the invention includes an accumulator that includes a sleeve which defines an accumulator space as well as a storage vessel that defines the storage volume. The storage vessel may be a coil tube. Further the sleeve may also be a thermal insulator inhibiting thermal conduction into the cryogen space. The accumulator space may also include insulators includes thermal convection inhibitors as well as thermal conduction inhibitor including an evacuated space in this accumulator space. This is helpful where a heater is incorporated into the assembly.

Any material in the insulation space or in the accumulator space designed to reduce heat transfer may be chosen such that it falls below 15 W/m×K. In a further embodiment, the cryogenic tank assembly may include a pump, accumulator and heater integrated together wherein the accumulator would be integrated between the pump and heater. Integrated connections between each component may help to eliminate any potential failure point.

In a further embodiment of the invention, the accumulator may be disposed within a tank assembly space defined by an outer jacket of the cryogen tank. As such, the space between the outer jacket and the vessel may be used to house and support the accumulator, or, when used, the heater.

The present invention also contemplates a method of receiving a quantity of a fluid from a cryogen space at an initial pressure, pressurizing that fluid and storing the fluid within an accumulator disposed within the cryogen space wherein the fluid is readily available for delivery within a pre-determined pressure range. Further, the method may include heating and delivering the fluid as a pressurized gas where the fluid from the accumulator is heated.

The fluid in question in the invention may be at a pressure above or below the supercritical point of that fluid and the gas may too be above or below the supercritical point of the delivered gas. The gas delivered, however, must be at a higher pressure than its pressure in storage prior to pumping and being delivered to the accumulator. Also, where a heater is incorporated, the temperature of the delivered gas must at a temperature above that of the fluid found in storage prior to being pumped and delivered to the accumulator.

The present invention includes embodiments that draw from a stored fluid prior to pumping that includes fluids that comprise at least one of methane, methanol, ethane, propane, hydrogen, oxygen, butane, methane, ethane or other hydrocarbon derivatives that are gases at room temperature and atmospheric pressure, as well as, generally, a fluid that comprises an element that is combustible as a gas.

DETAILED DESCRIPTION OF PREFERRED EMBODIMENT(S)

Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

Generally, the subject invention relates to a fuel delivery system, namely, a cryogenic tank assembly that incorporates a cryogenic tank and an integrated apparatus comprising a pump and accumulator that is for use in a cryogenic environment. A heater may also be incorporated into the apparatus downstream of the accumulator.

Figure 1:
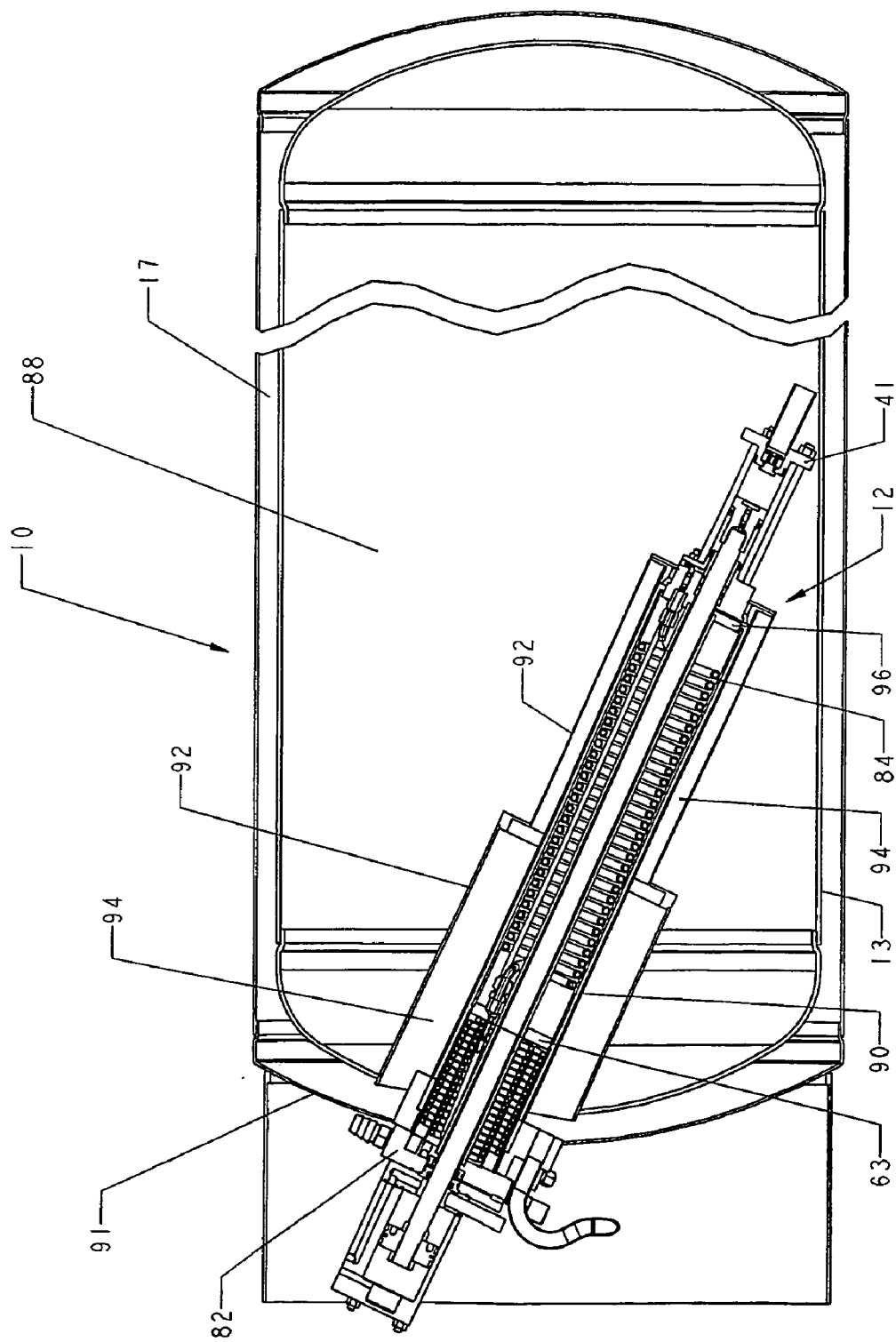
FIG. 1 is a cross sectional view of a cryogenic tank assembly that includes an apparatus for delivering a high pressure gas.
Figure 2:
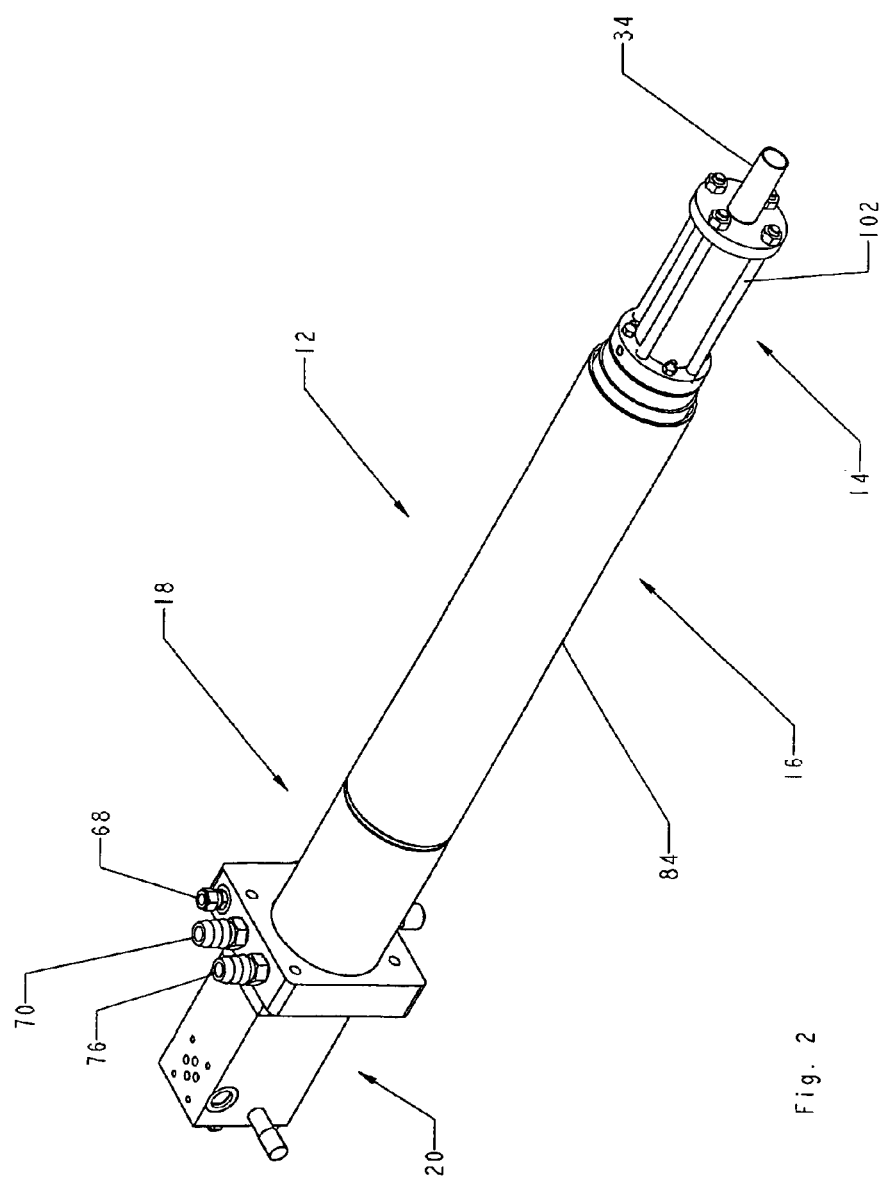
FIG. 2 is a cross sectional view of a preferred embodiment of the apparatus.
Figure 3:
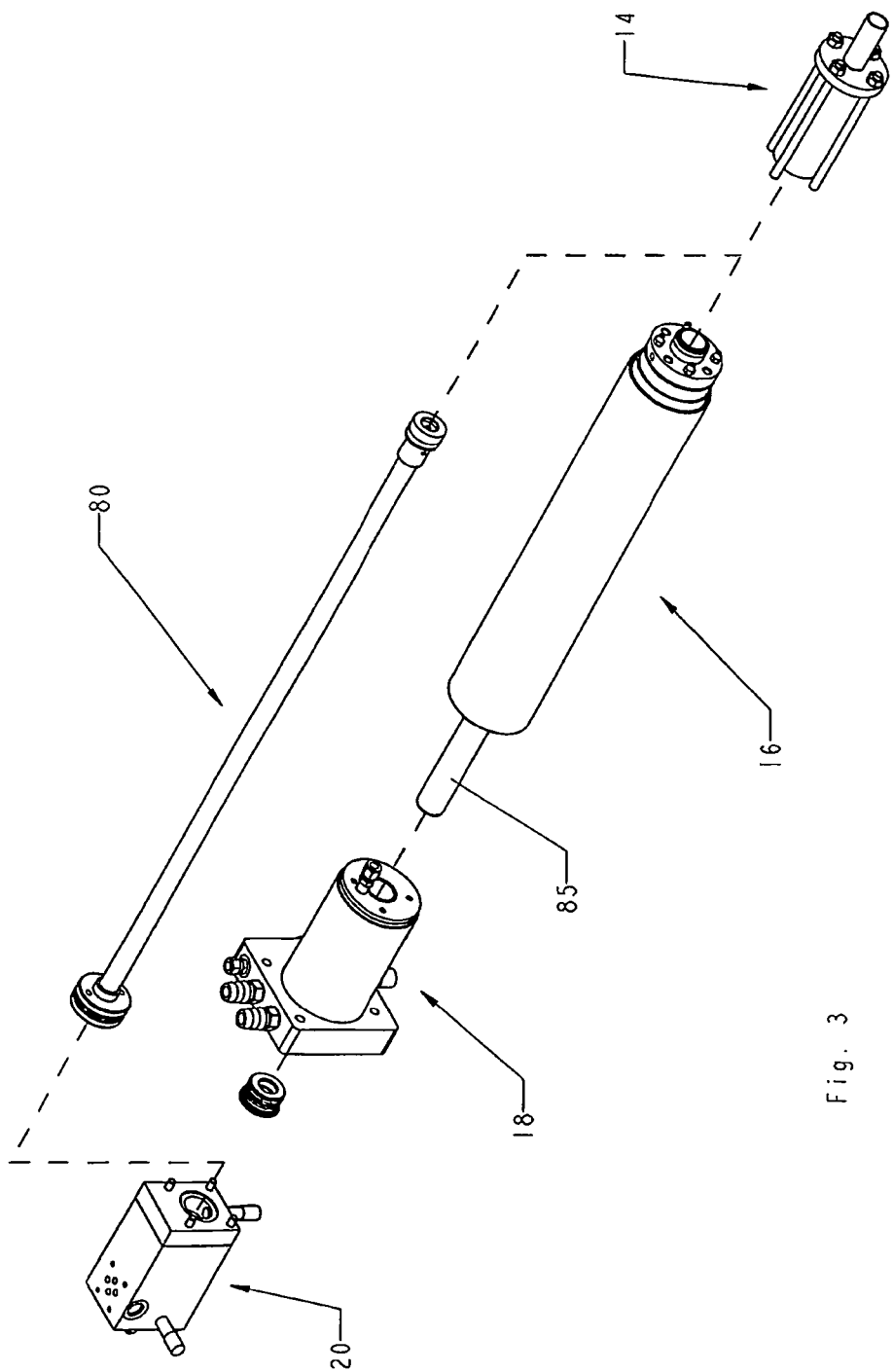
FIG. 3 is a perspective view of the apparatus.

With reference to FIG. 1, cryogenic tank assembly 10 is shown with apparatus 12 incorporated for the most part within vessel 13. Referring to FIGS. 2 and 3, apparatus 12 incorporates four distinct sections: cold end 14, accumulator 16, heater section 18 and drive section 20. In the embodiment shown, only drive section 20 extends beyond the cryogenic vessel. With reference to the cross sectional side view found in FIGS. 1 and 4, generally, a fluid pressurizing means such as a pump is housed in or embodied by cold end 14. Accumulator 16 is defined herein as comprising accumulator coil 24 and also the components that enable accumulator coil 24 to function as an accumulator as shown in the section generally identified as accumulator 16. A heater is housed in or embodied by heater section 18, and a pump driver is housed in or embodied by drive section 20.

Returning to the tank assembly generally, cryogenic tank 10 includes outer jacket 91 and vessel 13. Cryogen space 88, enclosed by vessel 13, allows for a volume of cryogenic fuel to be stored as a fluid. Further, in the embodiment shown, insulation space 17 is included between the vessel and the outer jacket. This space may be evacuated to provide a thermal insulator between cryogen space 88 and the outer jacket 91.

Figure 5:
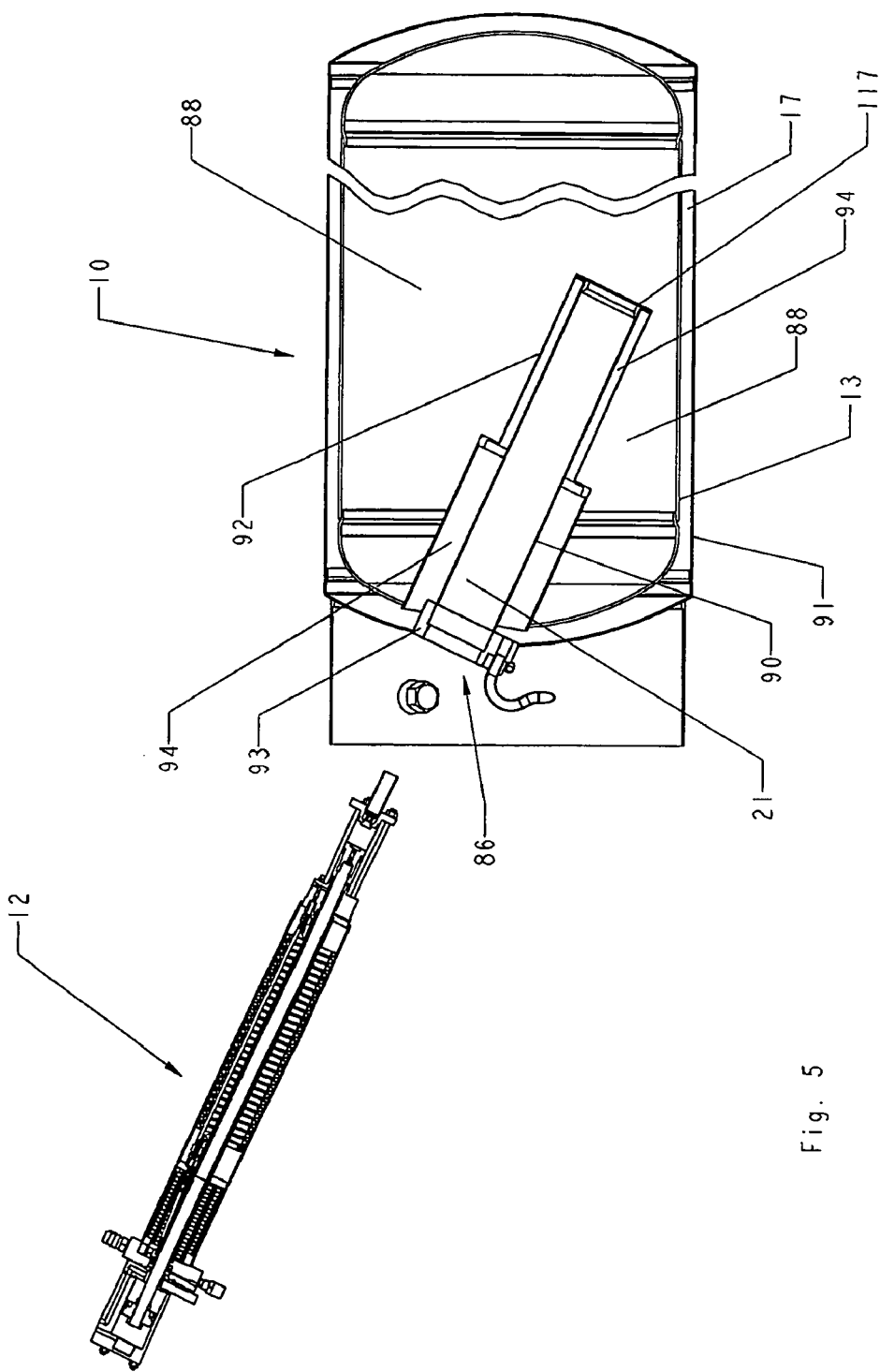
FIG. 5 is an exploded cross sectional view of the tank assembly.

FIG. 5 shows an exploded view of tank assembly 10 and apparatus 12 illustrating further the cooperation of these components. Extending into the tank is support wall 90 that houses and supports apparatus 12. In the embodiment shown, support channel 21 defined by support wall 90 extends into cryogen space 88. A barrier wall 92 is spaced apart from and surrounds support wall 90 wherein this wall is integrated into tank assembly 10 via a connection with vessel 13. This barrier wall also extends into cryogen space 88 and defines further insulation 94 space between support wall 90 and barrier wall 92. Insulation space 94 may be in communication with or sealed from insulation space 17.

When assembled tank assembly 10 finds apparatus 12 fitted through opening 86 and secured in support channel 21 wherein, in the embodiment shown, the accumulator and heater are generally disposed in cryogen space 88 supported directly by support member 90 and insulated from the cryogen space by insulation space 94. The pump defined by cold end 14 in the discussed embodiment, is directly exposed to cryogen space 88.

The embodiment discussed contemplates a natural gas fuel delivery system, that is, one where LNG is disposed in cryogen space 88. However, it is not limited to such a system. Generally, the discussion to follow can be adapted to, by way of example, fluid phases of hydrogen, methane, ethane, gaseous combustible hydrocarbon derivatives as well as oxygen as a combustion element.

Figure 4:
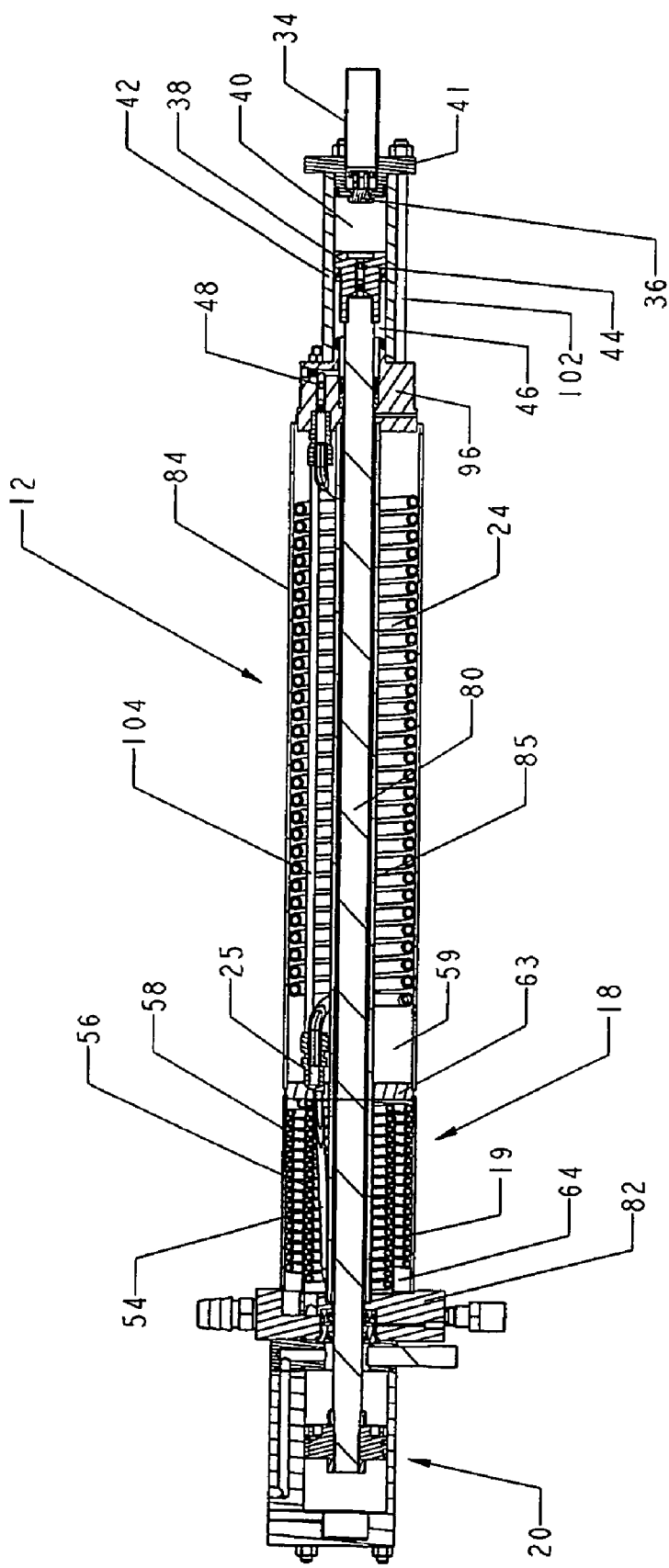
FIG. 4 is an exploded view of the apparatus.

Referring in more detail to the apparatus component of the tank assembly, by way of example, a preferred style of pump is a reciprocating piston pump as shown in the figures. Referring to FIG. 4, the pump comprises compression cylinder 42 within which piston 38 is disposed, dividing compression cylinder 42 into intake chamber 40 and pressure chamber 46. Intake chamber 40 is further defined by end plate 41, which seals one end of compression cylinder 42. The opposite end of compression cylinder 42 is sealed by intermediate plate 96, which further defines pressure chamber 46. In a preferred arrangement, tie rods 102 are employed to hold compression cylinder 42 between end plate 41 and intermediate plate 96.

Fluid may flow into intake chamber 40 from a fluid store in cryogen space 88 through intake tube 34 and then through inlet check valve 36. Both intake tube and inlet check valve are preferably associated with end plate 41. Piston 38 is dynamically sealed against the interior walls of compression cylinder 42 as is known to those skilled in the art. Piston 38 is movable within compression cylinder 42 under the influence of a pump driver housed in driver section 20, which is linked to piston 38 by piston shaft 80. Seals between piston shaft 80 and intermediate plate 96 prevent fluid from escaping therebetween.

Piston check valve 44 allows the one-way flow of fluid from intake chamber 40 to pressure chamber 46. Pump discharge check valve 48 is disposed within a discharge passage leading from pressure chamber 46. Pump discharge check valve 48 allows the one-way flow of fluid from pressure chamber 46 to accumulator coil 24.

In a preferred embodiment, at least a portion of the accumulator storage volume is defined by accumulator coil 24, which is a tube in the shape of a coil. Pressurized fluid received from the pump may be stored within the accumulator storage volume. As shown in the illustrated embodiments, accumulator coil 24 may be conveniently disposed around piston shaft 80. Accumulator 16 encloses accumulator coil 24 between intermediate plate 96 and boundary flange 63. At least one tie rod 104 parallel to piston shaft 80 may be employed to hold accumulator 16 between intermediate plate 96 and boundary flange 63. An accumulator with a coiled storage volume, while only one possible embodiment, is advantageous as it adapts well to temperature and pressure changes within the system. However, any one of many alternate accumulator designs may be used. These include accumulator cylinders or other storage vessels.

In the illustrated embodiment, the LNG or other fluid flows from accumulator coil 24 to heater section 18 through fluid outlet 25. The accumulator is separated from heater section 18 by boundary flange 63 which is preferably made from a material selected to reduce heat transfer from heater section 18 to accumulator 16. For example, boundary flange 63 may be made from G10 glass fibre composite which has a thermal conductivity of about 2.1 W/m×K.

Similarly, accumulator sleeve 84 extends from intermediate plate 96 through to boundary flange 63, housing the accumulator coil 24 and defining accumulator space 59 within accumulator 16 helping to prevent heat transfer from the heater section into accumulator 16 and the pump. Insulating material may be included in the accumulator space such as convection barriers, conductive thermal insulators, an evacuated space, or a combination of such thermal insulation measures.

It is preferable for the fluid within the accumulator to be maintained at colder temperatures since warming the pressurized fluid will decrease its density and may even cause it to be converted to a gas negating the benefits of storing the fluid in a denser state compared to storing the same fluid in a gaseous phase. Accordingly, it is desirable to prevent heat from being transferred from heater section 18 to accumulator 16 to maximize the amount of fluid that can be stored in the accumulator.

By way of example, in the case of natural gas, pressurized liquefied natural gas, depending upon the operational conditions, may be about three times denser than the same quantity of pressurized natural gas in a gaseous form. By maintaining LNG or fluid within accumulator coil 24, each incremental increase in the accumulator coil volume corresponds to, utilizing the example above, an equivalent three fold increase in a corresponding volume of the same fluid where that fluid is a gas. In other words, by placing accumulator 16 upstream of the heater and thermally isolated therefrom, a greater density can be stored per unit of accumulator volume. Utilizing the same example, an accumulator coil volume of approximately 0.3 litres of natural gas equals approximately 0.90 litres of natural gas found in prior art accumulators designed to store fuel at pressures similar to that of the gas exiting apparatus 12.

Heater section 18 is described with reference to FIGS. 2 and 8. In a preferred arrangement, a heat exchanger is employed to transfer heat to the pressurized fluid from a heat exchange fluid housed in the heat exchanger that is capable of warming the pressurized fluid. The pressurized fluid flows sequentially from fluid outlet 25 through heater introduction tube 54, inner tubular coil 56, outer tubular coil 58, and then finally through delivery nozzle 68. The amount of heat transferred to the pressurized fluid is sufficient to convert the pressurized fluid to a gas.

Introduction tube 54 and inner tubular coil 56 are disposed within inner heat bath channel 60 and outer tubular coil 58 is disposed within outer heat bath channel 64. Inner channel 60 communicates with heat exchange fluid inlet 70 (shown in FIG. 2). Channel passageway 72 allows a heat exchange fluid to flow from inner channel 60 to outer channel 64. Outer channel 64 communicates with heat exchange fluid outlet 76 (shown in FIG. 2).

Rod sleeve 85 extends from intermediate plate 96 through to drive head flange 82, preventing heat exchange fluid from leaking past the seals and bearings associated with piston shaft 80. Heater sleeve 19 extends between drive head flange 82 and boundary flange 63, further defining outer channel 64.

A feature of the illustrated preferred apparatus is that the pump, accumulator coil 24 and the heater are integrated in series. This is contrary to conventional systems which located an accumulator proximate to the end user and downstream from the heater. Another advantage is that the pump may be coupled directly to accumulator coil 24 which, in turn, may be directly coupled to the heater without the necessity of interconnecting piping and the additional joints associated therewith. The method of operating the apparatus is described below. In operation, piston 38 is at rest or being actuated in a retraction stroke or an extension stroke. The events occurring during a retraction stroke are described first.

Figure 6:
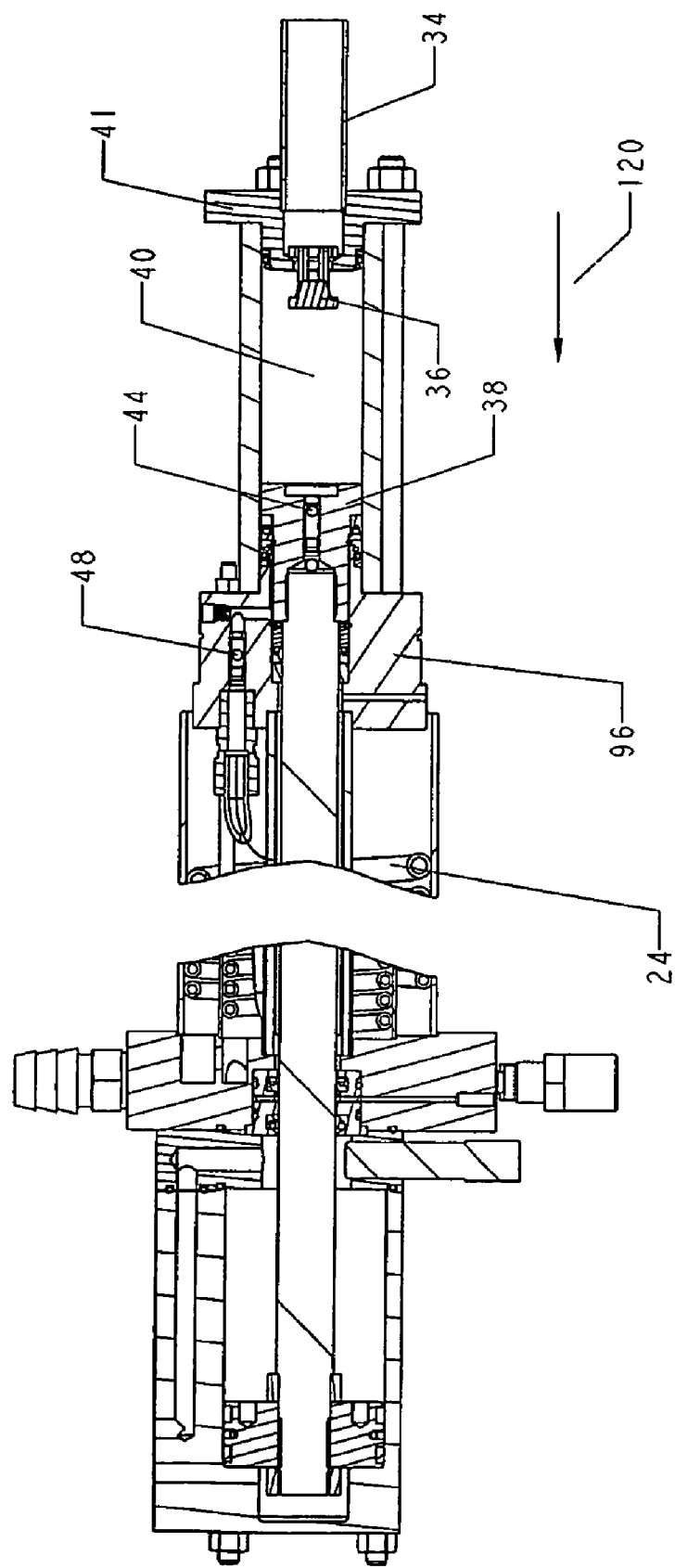
FIG. 6 is an enlarged partial cross sectional view of a preferred embodiment of the apparatus showing the drive section and the cold end when the pump piston is completing a retraction stroke.
Figure 7:
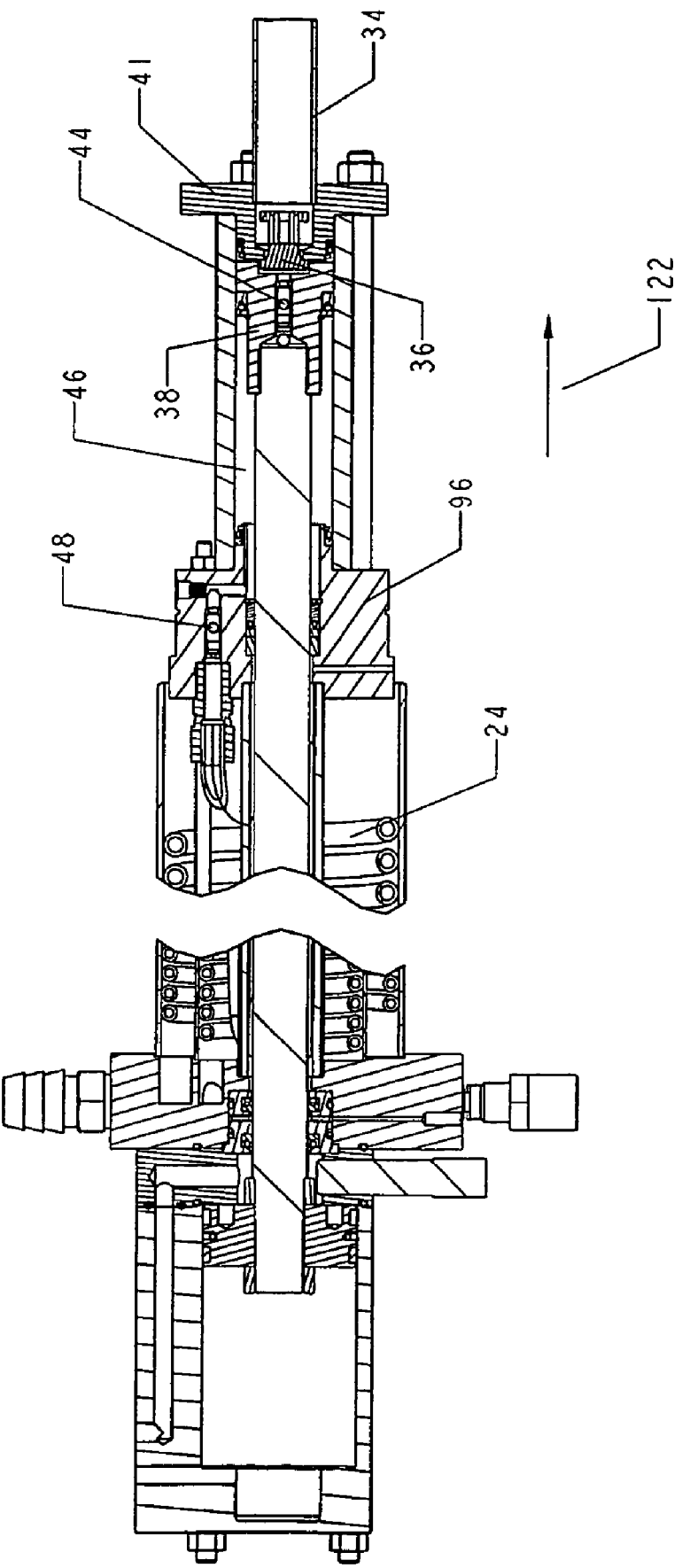
FIG. 7 is a cross sectional view of a preferred embodiment of the apparatus showing the drive section and the cold end when the pump piston is completing an extension stroke.

With reference to FIG. 6, piston 38 has just completed a retraction stroke by moving in the direction of arrow 120 from a position proximate to end plate 41 to a position proximate to intermediate plate 96. Inlet check valve 36 is opened and fluid has flowed into intake chamber 40 through intake tube 34. At the same time, fluid that was in pressure chamber 46 (shown in FIG. 7), has been pressurized to a pressure that holds piston check valve 44 closed. The retraction of piston 38 has also caused the volume of pressure chamber 46 to be reduced whereby earlier in the retraction stroke, the fluid pressure within pressure chamber 46 was elevated to a pressure higher than the pressure of the pressurized fluid within accumulator coil 24, causing pump discharge valve 48 to open, resulting in some of the pressurized fluid flowing from pressure chamber 46 to accumulator coil 24.

Of course, as would be apparent to a person skilled in the art, it would be possible to feed LNG or another fluid from pressure chamber 46 directly into accumulator coil 24 without passing it first through a check valve, however, operation of the apparatus and gas delivery system as a whole is enhanced by including pump discharge check valve 48. Amongst other things, the inclusion of pump discharge check valve 48 helps to reduce pressure variations downstream of the pump.

Figure 8:
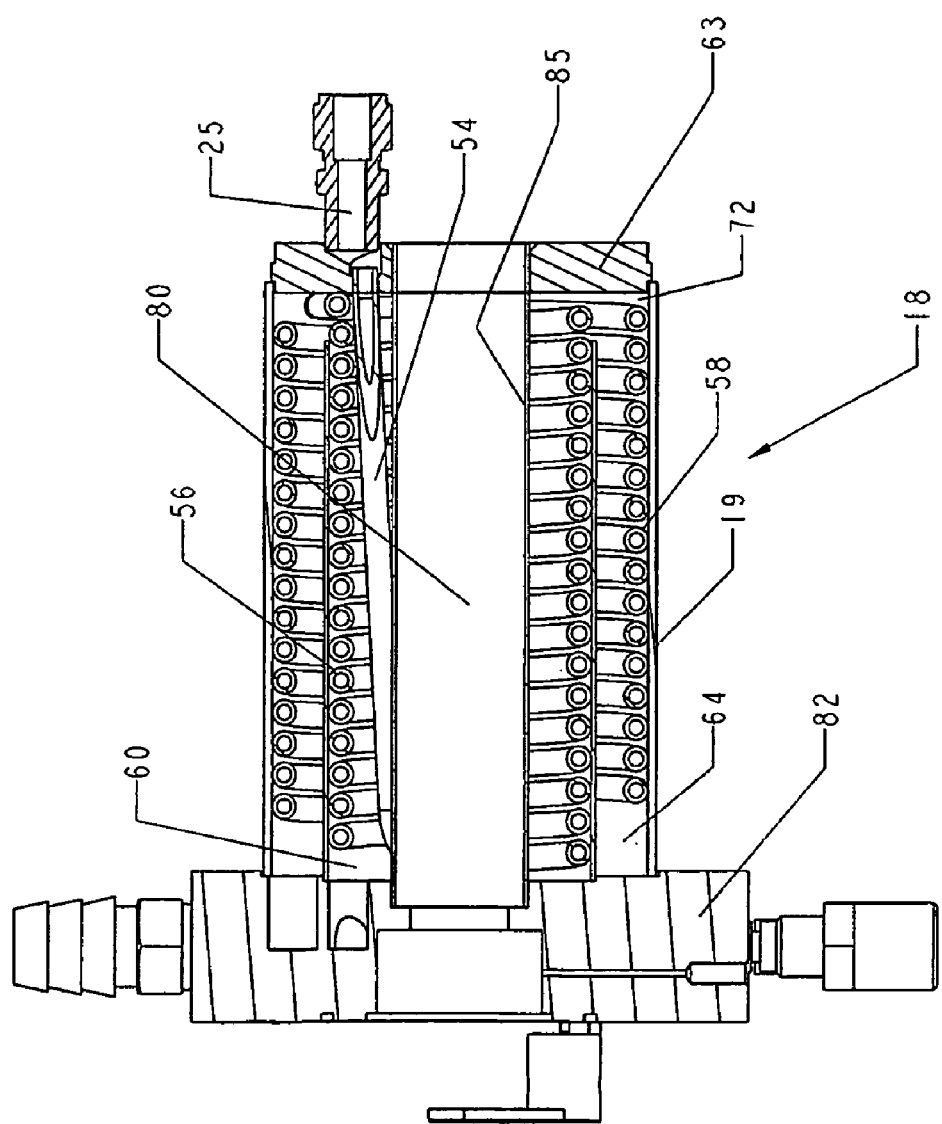
FIG. 8 is a cross sectional view of the heater section.

The introduction of pressurized fluid into accumulator coil 24 from pressure chamber 46 displaces pressurized fluid already within accumulator coil 24 such that pressurized fluid flows through accumulator fluid outlet 25 and into heater section 18 (see FIG. 8).

The operation of heater section 18 will be described with reference to FIG. 8. Pressurized fluid enters heater section 18 from accumulator fluid outlet 25 through heater introduction tube 54. The pressurized fluid entering heater section 18 may still be at a cryogenic temperature that may be lower than the freezing temperature of the heat exchange fluid. To reduce the likelihood of freezing the heat exchange fluid, heater introduction tube 54 directs the pressurized fluid to a location proximate to where the heat exchange fluid is first introduced into the heater. In the illustrated embodiment, heat exchange fluid is first introduced into inner heat bath channel 60 near drive head flange 82. Accordingly, the coldest part of inner coil 56 is exposed to the warmest part of the heat bath.

The heat exchange fluid flows through inner channel 60 and outer channel 64 in the same general direction as the pressurized fluid flowing through inner tubular coil 56 and then outer tubular coil 58. Depending on the operating conditions for the particular application for which the apparatus is employed, and, in particular, the temperature of the pressurized fluid and the temperature of the heat exchange fluid, the length of the pressurized fluid coil within the heat bath is determined so that the pressurized fluid exits heater section 18 as a gas that has been heated to a temperature within a pre-determined temperature range. The gas will then also be delivered from the apparatus at a temperature within a pre-determined pressure range.

When the apparatus is employed to deliver a gaseous fuel to an engine, the engine coolant can be used as a suitable and convenient heat exchange fluid that may be delivered to the apparatus. In such an apparatus, engine coolant that has been heated after passing through the cooling jacket of the engine may be delivered to the heat bath in heater section 18 where it is cooled prior to being returned to the engine cooling system.

A complete pump cycle includes a retraction stroke and an extension stroke. The extension stroke is described with reference to FIG. 7, which depicts piston 38 having just completed an extension stroke by moving in the direction of arrow 122 from a position proximate to intermediate plate 96 to a position proximate to end plate 41.

During the extension stroke, the movement of piston 38 in the direction of arrow 122 pressurizes the fluid within intake chamber 40 (shown in FIG. 6) causing inlet check valve 36 to close and piston check valve 44 to open. The fluid pressurized within intake chamber 40 flows through open piston check valve 44 into pressure chamber 46. At the beginning of the extension stroke, the pressure within pressure chamber 46 is lower than the pressure of the fluid within accumulator coil 24. Accordingly, pump discharge check valve 48 is held closed by the pressure differential. Later in the extension stroke, because the volume of intake chamber 40 is much larger than the volume of pressure chamber 46, the transfer of the fluid into pressure chamber 46 causes the pressure therein to rise. Eventually, the pressure within pressure chamber 46 exceeds the pressure of the fluid within accumulator coil 24 and pump discharge check valve 48 opens to allow some of the fluid within pressure chamber 46 to flow into accumulator coil 24.

In this manner, the pump operates as a double acting pump. In preferred arrangements, the displaceable volume of intake chamber 40 is sized larger than the displaceable volume of pressure chamber 46 and preferably sized approximately two times larger than the displaceable volume of pressure chamber 46. Preferably, the quantity of fluid discharged from the pump is about equal for each extension and retraction stroke.

During the extension stroke, the flow of the pressurized fluid through accumulator coil 24 and the operation of heater section 18 is essentially the same as described with respect to the retraction stroke and, as such, will not be repeated with respect to the extension stroke.

As is well known in the art, the apparatus may be operated to maintain certain parameters such as, for example, the pressure within the accumulator, or the pressure and temperature of the fluid delivered from the apparatus. One or more sensors within the delivery system or apparatus 12, may be employed to cause a controller to activate the pump driver housed in the drive section. The pump driver, in turn, actuates piston shaft 80 to drive piston 38 according to the pump cycle described above. At times when demand is low, the controller may also cause pump piston 38 to remain at rest.

In the preferred arrangement described above, the heater section employs a particular embodiment of a heat exchanger to transfer heat from a heat exchange fluid, e.g., engine coolant, to the pressurized fluid. Of course, as would be apparent to a person skilled in the art, alternate variations of the heater found in the embodiment discussed above may be utilized. For example, instead of an inner and outer coil for conveying the pressurized fluid, a single coil may be employed. Other variations on the embodiment discussed include but are not limited to alternate configurations that utilize a warmed channel or set of channels through which the pressurized fluid is circulated, heated, and converted to a gas.

More generally, however, conventional heaters may be housed in the heater section without affecting the spirit of the invention. As noted above, the benefits of the invention are realized where a heater functions within the apparatus in a space that allows for a maximization of the volume in the accumulator. Such heaters include elements for transferring heat to a fluid thus raising the temperature of the fluid to operational temperatures within a time frame to meet the operational parameters of the subject system. These conventional heaters may include electric heaters such as heaters employing a hot wire element, fins, plates and frames, and other devices well known to those skilled in the art.

Referring to the embodiment of the apparatus shown in FIG. 1, the tank assembly including the apparatus draws in a low pressure fluid such as LNG, from tank assembly 10 and delivers the fluid in as a pressurized gas, such as natural gas. Generally, a temperature gradient is introduced in such a system:

along an axis running parallel to piston shaft 80; and,
at right angles to piston shaft 80 varying along the length of the shaft from a maximum in parts of heater section 18 to a nominal gradient within the cold section and other upstream parts of accumulator 16.

Maintaining the axial temperature gradient, that is, the temperature gradient parallel to the axis of piston shaft 80, is important because any heat leak into the accumulator coil from the heater decreases the density of this fluid and negates the advantages realized by providing the accumulator upstream of the heater where a cooler fluid environment exists. The axial temperature gradient may be maintained by providing barriers to thermal conductivity between the four sections of apparatus 12. The embodiment shown provides boundary flange 63 and drive head flange 82. These flanges separate the accumulator shown as accumulator 16 and heater section 18 and heater section 18 and drive section 20, respectively. As mentioned above, thermal separation between heater section 18 and accumulator coil 24 is particularly important.

While these flanges help to thermally isolate these sections of the apparatus, the fluid flow through apparatus 12 also helps to transport heat away from cold end 14 and in the direction of warmer heater section 18 and out of the system. Also, the use of accumulator coil 24 as opposed to another type of accumulator storage vessel, lengthens the conductive heat path from heater section 18 to cold end 14. Other heat paths through the accumulator include a convective heat path through the space surrounding accumulator coil 24. As mentioned above, insulating materials can be included within this accumulator space to help thermally isolate heater section 18 from accumulator 16 and cold end 14. Again barrier materials may also be used to reduce thermal convection resulting from circulating gases within this accumulator space. Alternatively, the accumulator space surrounding accumulator coil 24 may be evacuated.

A further heat path from heater section 18 into the accumulator runs along accumulator sleeve 84. Suitable insulating materials known to persons skilled in the art may be employed to help with thermally isolating heater section 18 from accumulator 16 and cold end 14. In the illustrated embodiment, accumulator coil 24 contains the pressurized fluid so accumulator sleeve 84 need not be designed to contain pressurized cryogenic fluids. Therefore, the selected material for sleeve 84 may be chosen with priority to thermal conductivity properties rather than for structural characteristics.

The transverse temperature gradient, that is, generally perpendicular to piston shaft 80, is also a potential problem when positioning apparatus 12 within cryogenic tanks generally. Heat from the heater within the heater section that leaks into accumulator 16, if any, as well as heat within the heater section itself, causes a further temperature gradient between parts of apparatus 12 and cryogen space 88 within vessel 13 of tank assembly 10. Referring to FIGS. 1 and 5, support and barrier walls or insulating walls 90 and 92 extend into vessel 13. In the embodiment shown, therefore, heater section 18 and accumulator 16 are separated and thermally insulated from tank interior 88. The support wall 90 extended into tank assembly 10 from outer jacket 91 where support wall 90 creates tank opening 86. Defined between support wall 90 and a second or barrier wall 92 is insulated space 94, which may contain suitable insulating material and/or a vacuum space. In the embodiment shown, barrier wall 92 is joined to vessel 13. The insulation space 94 in the embodiment shown in FIG. 5 is in communication with insulation space 17 surrounding vessel 13. This may be of value when utilizing a vacuum for these insulation spaces. However, insulation space 17 of the tank assembly may also be isolated from insulation space 94 with similar insulating effect.

As noted above, accumulator sleeve 84 is also constructed of a material suitable to help insulate the apparatus from cryogen space 88. In this case, the sleeve acts to inhibit transverse heat flow from apparatus 12 through to support wall 90. Support wall 90 and accumulator sleeve 84 are abutted together where each is designed to receive the other and, therefore, help support apparatus 12. In the illustrated embodiment, support wall 90 seals off apparatus 12 from cryogen space 88 near intermediate plate 96 with a cryogen seal that encircles apparatus 12 at or near intermediate plate 96. This helps to reduce transverse and axial heat transfer. A further seal may be included around apparatus 12 near the entrance of tank assembly 10. In the embodiment shown such a seal may be placed at or near drive head flange 82 such that cold end 14 is directly exposed to cryogen space 88.

Note, generally, that the apparatus may include an encasing chosen to, amongst other things, insulate or inhibit transverse heat flow. While the embodiment includes an insulating space integrated into the cryogen vessel, this space or insulating material may be integrated into the apparatus itself to surround the heater and accumulator. This encasing may also be used to help protect the various components of the apparatus.

The length of accumulator 16 and the length of support wall 90, which are related in the embodiment shown, are preferably chosen such that this length is elongated. As accumulator 16 and support wall 90 and/or barrier wall 92 provide a heat path into cryogenic environment 88 within tank 10, lengthening these sections helps to reduce the effect of this heat path. In the embodiment shown, apparatus 12 is inserted into the tank interior on an angle that helps to elongate these dimensions.

Referring to FIGS. 2 and 4, in the illustrated embodiment, apparatus 12 is bound together by tie rods. As described above, cold end 14 and accumulator 16 are joined together by compression cylinder tie rods 102, and accumulator tie rods 104 run the length of accumulator 16 holding the accumulator between heater section 18 and cold end 14. While tie rods have been found to provide a cost and maintenance advantage, those skilled in the art will understand that the apparatus may also be bound by numerous other means. By way of example the heater, accumulator and pump may be integrated together by threaded connections, bolts, welded joints, or bound by any one or combination of a variety of known means for attaching one device to another to make an integrated apparatus.

The materials utilized for accumulator coil 24, inner and outer tubular coils (56, 58) in heater section 18, cylinder 42, tie rods (102, 104), intake tube 34, accumulator sleeve 84, boundary flange 63 and drive head flange 82 as well as other parts of the apparatus are chosen for, amongst other things, their capacity to react to temperature gradients, withstand high pressures and insulate against heat conduction. Such materials are known to persons skilled in the art.

Referring again to FIG. 5, support wall 90 and barrier wall 92 provide support to vessel 13 as well as apparatus 12. In the embodiment shown, support wall 90 is fixed to outer jacket 91 through opening flange 93. At the end extended into the cryogenic space, support wall 90 is then joined to barrier wall 92 through wall joint 117. The barrier wall 92, broken to a wider diameter approximately halfway along its length in the embodiment shown, extends back to connect to vessel 13. As such, a complete support path is also provided from outer jacket 91 to help support vessel 13 for, amongst other reasons, maintaining any desired insulation space such as insulation space 17.

While the embodiment discussed considers a single piston pump with two chambers, namely intake chamber 40 and pressure chamber 46, other pump arrangements may be employed to pressurize the fluid drawn from a vessel to higher pressures. For example, it is understood that a piston pump with more than one piston or a different number of chambers may be substituted for the illustrated embodiment.

By way of example, the description discloses an apparatus that may be employed to deliver a high pressure gas utilizing the properties of the gas in a denser state to enhance the effective accumulator capacity and more easily pressurize the gas. It is understood, however, that these properties are realized in a general sense when the apparatus:

draws in a fluid at an initial temperature, $T_1$, and an initial pressure, $P_1$;

raises the pressure of that fluid to $P_2$, a pressure falling within a pre-determined pressure range, where $P_2 > P_1$;

stores the fluid in an accumulator at a pressure within the predetermined pressure range, approximately $P_2$;

warms the fluid in a heater to temperature $T_2$, which falls within a pre-determined temperature range that converts the fluid to a gas, where $T_2 > T_1$; and, delivers the gas at a temperature and pressure within the pre-determined temperature and pressure ranges, approximately $T_2$ and $P_2$.

As such, it is understood that the fluid will be drawn in as a fluid and delivered as a gas with a higher temperature and pressure relative to the initial temperature and pressure. In a preferred embodiment, a liquid may be drawn into the apparatus and a gas delivered from the apparatus. However, depending on the operational conditions of the stored fluid and the desired properties of the gas to be delivered, a liquid or supercritical fluid or a single phase fluid may be drawn in and a gas at or above the supercritical point may be delivered. Such a gas may be thought of as a supercritical fluid or single phase fluid as well. The invention contemplates such states for the delivered gas and stored fluid.

Therefore, as noted previously, as understood in this application, "fluids", as understood in this application, are liquids and liquids under supercritical pressures. "Gases" as understood in this application, are gases and gases under supercritical pressures. These terms are mutually exclusive. Further, while the embodiment shown includes a hydraulic pump driver within drive section 20, numerous other drivers will suffice without departing significantly from the spirit of the invention as will be apparent to a person skilled in the art. By way of example, these may include electric motors, mechanical or engine drivers, pneumatic drivers, and so forth. The driver is a potential heat source so it is preferably disposed away from the cryogen space and the colder pump and accumulator to reduce heat transfer to the stored cold fluid. The illustrated embodiment positions the heater and/or accumulator between the pump and the driver to assist with managing the axial temperature gradient within apparatus 12 while allowing direct fluid connections between the pump, the accumulator and the heater, thereby eliminating the need for piping between these components and reducing the number of connections which might be a source of leaks and/or failure points. The illustrated embodiment also provides a convenient arrangement for locating piston shaft 80.

Figure 9:
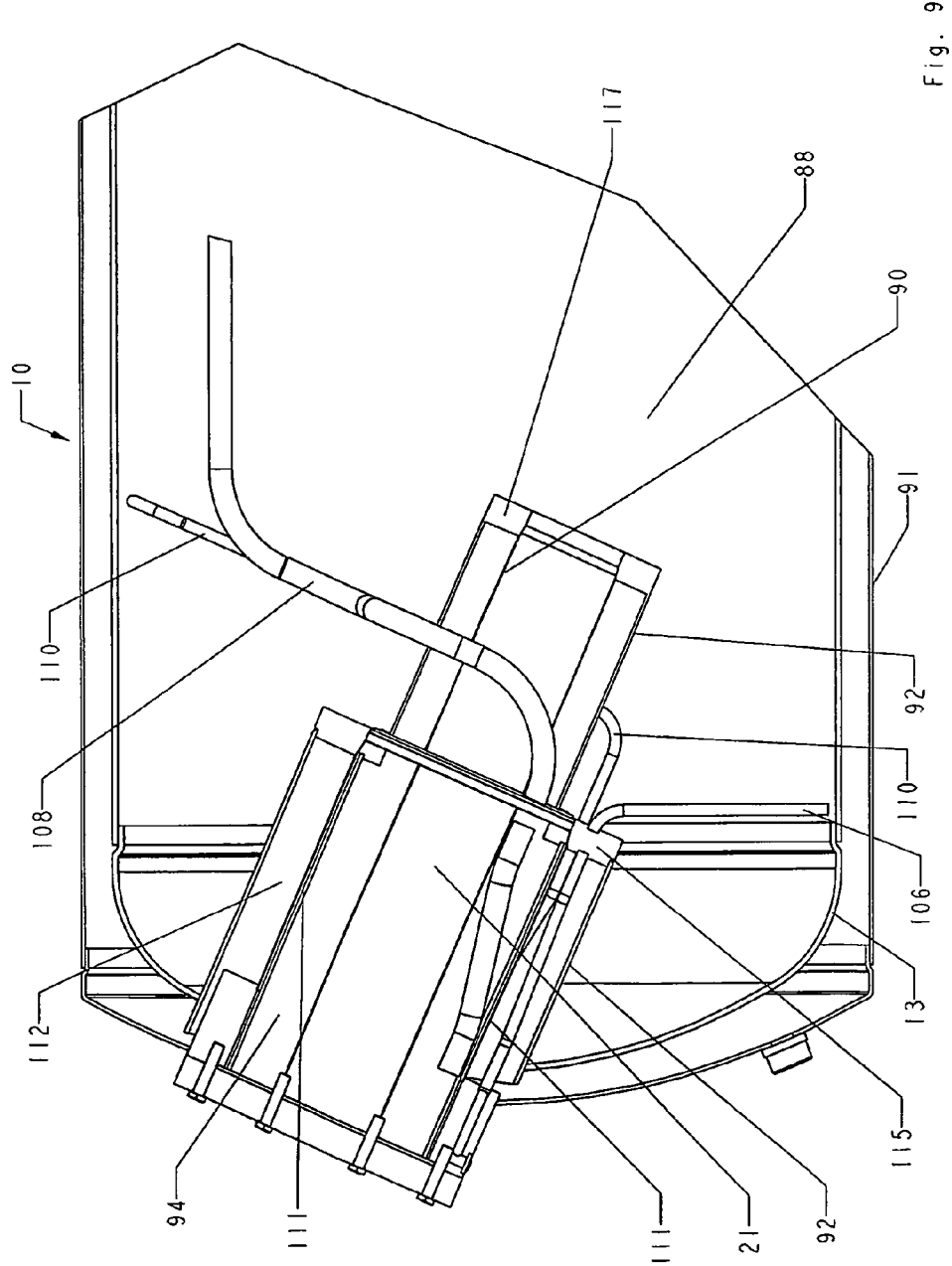
FIG. 9 is a cross sectional view of the support and barrier walls within an embodiment of the cryogenic tank.

Referring to FIGS. 1 and 9, a further embodiment of tank assembly 10 is shown with the apparatus removed. This embodiment further includes along with support wall 90, barrier walls 92 and insulated space 94, a second support wall 111 and a series of lines or pipes between the outer jacket 91 and the cryogen space, namely, fluid drain pipe 106, fluid fill pipe 108 and vapour vent pipe 110. These pipes may be disposed in insulation space 94. Note that a second insulation space 112 occurs between the second support wall 111 and barrier wall 92.

Prior art cryogenic fuel delivery system tanks have required special means for reducing heat transfer through these access pipes to tank interior 88. However, the necessary creation of insulated space 94 extending into tank 10 allows for a means of providing these communication vents and pipes with an already existing extended length of insulated space 94. This maximizes the heat path length along these pipes without any need to provide a system for doing so solely to support this plumbing.

Moreover, while not necessary, a second support wall may be included to help facilitate the pathway of some of the plumbing mentioned (106, 108, 110) and/or to provide additional support to the support wall 90 and, consequently, to the apparatus in housing space 21. The embodiment of the tank shown in FIG. 9 includes second support wall 111 that provides additional support for vessel 13 as well as the apparatus. Again, the space between barrier wall 92 and support wall 90 provides for two insulation spaces (94, 112) divided by second support wall 111. Here second support wall 111 is fastened to the outer jacket. The length of second support wall 111 is approximately one-half of the length of support wall running from the outer jacket to intermediate flange 115. This provides two insulation channels for plumbing wherein fluid fill pipe 108 runs generally through space 94 and fluid drain pipe 106 and vapour vent pipe 110 run through space 112.

Fluid drain pipe 106, 108 and vapour vent pipe 110 also provide for a further support means for support wall 90 and vessel 13 as each may be secured to the outer jacket 91 and either intermediate flange 115, as shown, or wall joint 117 which connect support wall 90 and barrier wall 92. As both intermediate flange 115 and wall joint 117 are connected to vessel 13 through barrier wall 92, further support is leant to the tank assembly as a whole via these pipe configurations.

Figure 10:
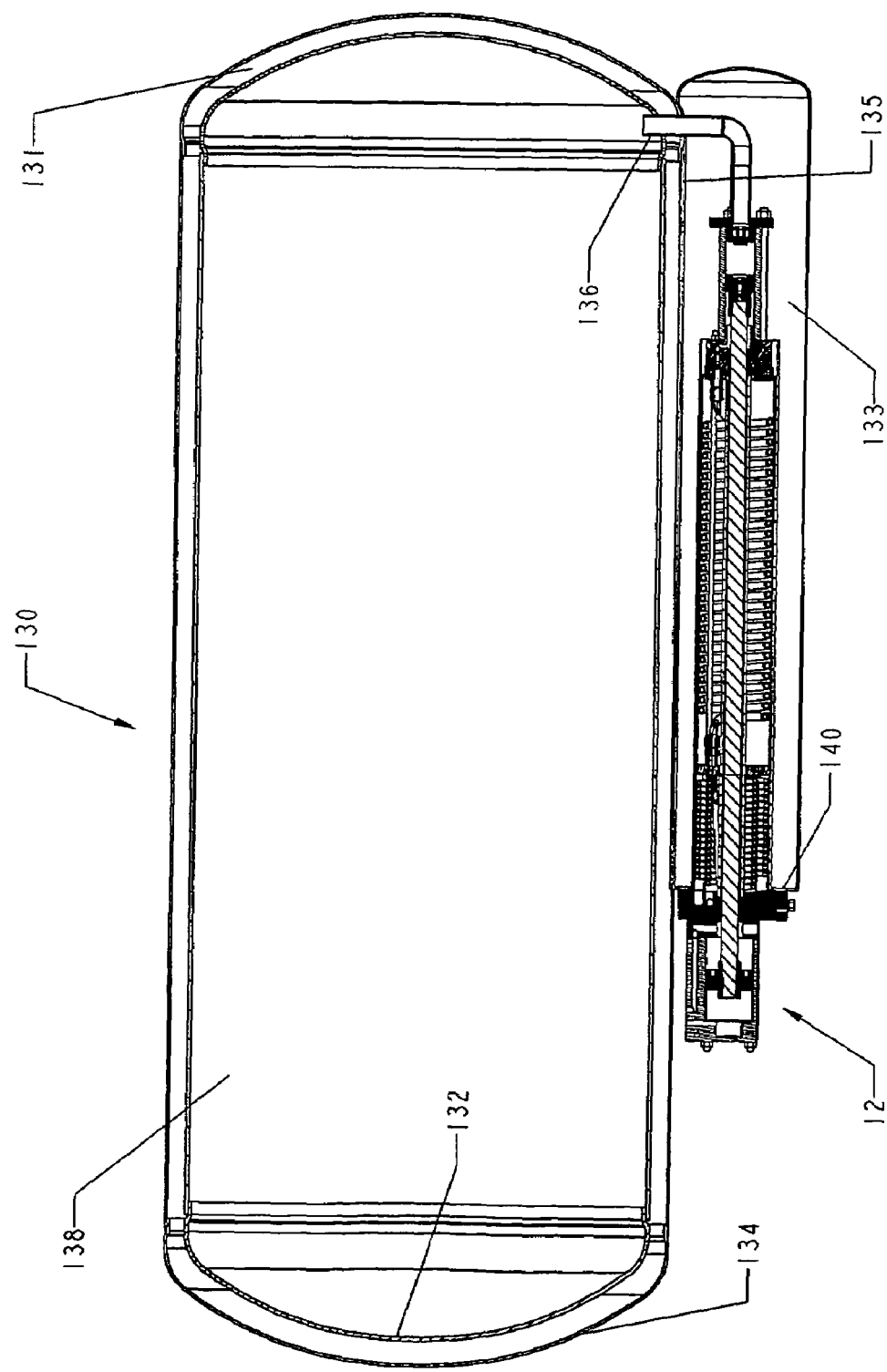
FIG. 10 is a cross sectional view of an alternate configuration of the cryogenic tank assembly that includes an apparatus for delivering a high pressure gas.

Referring to a further embodiment of the tank assembly shown in FIG. 10, an accumulator and pump are integrated into tank assembly 130 where apparatus 12 is disposed in thermal insulation space 133 between vessel 132 and outer jacket 134 where the outer jacket is expanded away from vessel 132 to provide for insulation space 133. Support wall 135 is shown in the embodiment and may be incorporated to help structurally contain and/or thermally isolate apparatus 12. An alternate embodiment need not include wall 135 wherein insulation space 133 is part of insulation space 131. Further, insulation space 133 may be isolated by support wall 135 from insulation space 131. Alternately, insulation space 133 may be in communication with insulation space 131 through support wall 135 such that an evacuated space used in insulation spaces 131 and 133 is shared. Here intake tube 136 is extended from apparatus 12 into the cryogen space 138. Again, the heater section, accumulator and pump are incorporated into the tank assembly within the insulating space bounded by jacket flange 140. In principle, a pressurized gaseous fuel is delivered from the tank assembly by the same process describe above in regards to the interaction of the apparatus and stored fluid within the tank assembly as a whole. As such, for the purposes of brevity, it will not be discussed again. The main difference is the placement of apparatus 12 within tank assembly 130. The accumulator still forms part of the assembly, storing a pressurized fluid thus deriving the advantages set out above.

By way of example but in no way limiting the scope of the disclosed invention, the following includes some approximate system details regarding the design parameters of an embodiment that would be appropriate for delivering high pressure natural gas to an engine from a cryogenic environment:

| | |
|---|---|
| Fuel storage temperature: | <200 K |
| Accumulator operational pressure: | 5000-5600 psig |
| Operational heat bath temperature: | 283-343 K |
| Inner and outer coil volume: | $1.65 \times 10^5$ mm$^3$ |
| Inner and outer coil internal diameter: | 3.86 mm |
| Accumulator coil volume: | $3.32 \times 10^5$ mm$^3$ |
| Accumulator coil internal diameter: | 6.22 mm |
| Pressure chamber vol. (extended): | $3.74 \times 10^5$ mm$^3$ |
| Pressure chamber vol. (retracted): | $3.44 \times 10^5$ mm$^3$ |

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A cryogenic tank assembly comprising:
    a. a vessel defining a cryogen space capable of storing a fluid at a cryogenic temperature and an initial pressure;
    b. a pump comprising:
        i. an intake opening disposed in said cryogen space for receiving a quantity of said fluid from said cryogen space;
        ii. a pressurizing device capable of pressurizing said quantity of said fluid to a pre-determined pressure, said pre-determined pressure being greater than said initial pressure and said pressurizing device being in communication with said intake opening; and,
        iii. a high pressure discharge passage in communication with said pressurizing device for discharging said quantity of said fluid from said pressurizing device,
    c. an accumulator comprising:
        i. an entrance for receiving said quantity of said fluid from said high pressure discharge passage;
        ii. a storage volume in communication with said entrance; and,
        iii. an exit in communication with said storage volume for delivering said quantity of said fluid,
wherein a percentage of said accumulator is disposed within said cryogen space.

2. A cryogenic tank assembly as claimed in claim 1 further comprising a housing, said housing surrounding said percentage of said accumulator, said housing providing structural support to said accumulator.

3. A cryogenic tank assembly as claimed in claim 1 further comprising a heater capable of receiving said quantity of said fluid through said exit, said heater comprising:
    a. a heater inlet; and,
    b. a delivery outlet capable of delivering said quantity of said fluid as a gas at a pre-determined temperature, said pre-determined temperature being greater than said cryogenic temperature.

4. A cryogenic tank assembly as claimed in claim 3 wherein a percentage of said heater is disposed within said cryogen space.

5. A cryogenic tank assembly as claimed in claim 3 further comprising a housing, said housing surrounding said percentage of said accumulator, said housing providing thermal insulation between said accumulator and said cryogenic space.

6. A cryogenic tank assembly as claimed in claim 5, wherein said housing comprises an inner wall defining a housing space and an outer wall surrounding said inner wall, said outer wall defining a thermal insulation space between said inner wall and said outer wall, and said outer wall comprising an outer surface, a percentage of said outer surface facing said cryogen space, wherein said percentage of said accumulator is within said housing space.

7. A cryogenic tank assembly as claimed in claim 3, further comprising a housing defining a housing space, said housing comprising a first end and a second end, said first end attached to said vessel and said second end extending into said cryogen space such that a percentage of said housing space is defined within said cryogen space, wherein a second percentage of said accumulator is disposed within said housing space.

8. A cryogenic tank assembly as claimed in claim 4 further comprising a housing, said housing surrounding:
   a. said percentage of said accumulator disposed within said cryogen space; and,
   b. said percentage of said heater disposed within said cryogen space, said housing providing thermal insulation between:
      said percentage of said accumulator and said cryogen space; and,
      said percentage of said heater and said cryogen space.

9. A cryogenic tank assembly as claimed in claim 8, wherein said housing comprises an inner wall defining a housing space and an outer wall surrounding said inner wall, whereby said outer wall defines a thermal insulation space between said inner wall and said outer wall, and said outer wall comprises an outer surface, and at least a portion of said outer surface faces said cryogen space, wherein:
   a. said percentage of said accumulator disposed within said cryogen space; and,
   b. said percentage of said heater disposed within said cryogen space are disposed within said housing space.

10. A cryogenic tank assembly as claimed in claim 5, further comprising a housing defining a housing space, said housing comprising a first end and a second end, said first end attached to said vessel and said second end extending into said cryogen space such that a percentage of said housing space is defined within said cryogen space, wherein:
   a second percentage of said accumulator is disposed within said housing space; and,
   a second percentage of said heater is disposed within said housing space.

11. A cryogenic tank assembly as claimed in claim 10, wherein said second percentage of said accumulator is wholly disposed within said cryogen space.

12. A cryogenic tank assembly as claimed in claim 11, wherein said second percentage of said heater is wholly disposed within said cryogen space.

13. A cryogenic tank assembly as claimed in claim 5, further comprising a suitable thermal insulator, said insulator providing insulation between said heater and said cryogen space.

14. A cryogenic tank assembly as claimed in claim 5 wherein said heater comprises a heating substance and at least one channel for housing said heating substance wherein said heating substance is capable of warming said cryogenic fluid such that said cryogenic fluid is converted to said gas.

15. A cryogenic tank assembly as claimed in claim 14 wherein said heating substance is a heating fluid capable of being circulated through said at least one channel.

16. A cryogenic tank assembly as claimed in claim 15 wherein said gas is capable of being delivered through said delivery outlet for use as a fuel in an engine and said heating fluid is engine coolant.

17. A cryogenic tank assembly as claimed in claim 14 wherein said heater further comprises a fluid passageway for directing said fluid from said heater inlet through said at least one channel to said delivery outlet.

18. A cryogenic tank assembly as claimed in claim 17 wherein said heater further comprises a pipe defining said fluid passageway, wherein said pipe is disposed in said channel.

19. A cryogenic tank assembly as claimed in claim 1, further comprising an outer jacket surrounding said vessel, said outer jacket defining an vessel insulation volume disposed between said outer jacket and said vessel.

20. A cryogenic tank assembly as claimed in claim 19 wherein said vessel insulation volume comprises an evacuated space.

21. A cryogenic tank assembly as claimed in claim 9, further comprising an outer jacket surrounding said vessel, said outer jacket defining a vessel insulation volume disposed between said outer jacket and said vessel wherein said thermal insulation space is in communication with said vessel insulation volume.

22. A cryogenic tank assembly as claimed in claim 21 wherein said inner wall comprises:
   a jacket end that is attached to said outer jacket; and,
   a cryogen end that extends into said cryogen space, and said outer wall comprises:
   a vessel end that is attached to said vessel; and,
      a second cryogen end that extends into said cryogen space and attaches to said cryogen end,
      such that said inner wall and said outer wall provide support to said vessel within said outer jacket.

23. A cryogenic tank assembly as claimed in claim 22, further comprising at least one access passage disposed in said thermal insulation space for communicating between said cryogen space and outside of said cryogen tank assembly.

24. A cryogenic tank assembly as claimed in claim 1 wherein said pump is a reciprocating pump further comprising at least one piston disposed within a cylinder, said piston dividing said cylinder into an intake chamber and a pressure chamber.

25. A cryogenic tank assembly as claimed in claim 24 wherein said intake chamber is in communication with said intake opening through an intake valve, said intake valve permits one-way flow of said quantity of said fluid into said intake chamber through said intake valve.

26. A cryogenic tank assembly as claimed in claim 24 wherein said intake chamber is in communication with said pressure chamber through a piston valve capable of allowing one-way flow of said quantity of said fluid into said pressure chamber from said intake chamber.

27. A cryogenic tank assembly as claimed in claim 26 wherein said piston valve is disposed in said piston.

28. A cryogenic tank assembly as claimed in claim 24 wherein said pressure chamber is in communication with said high pressure discharge passage such that said quantity of said fluid is flowable into said high pressure discharge passage once said fluid is at said pre-determined pressure.

29. A cryogenic tank assembly as claimed in claim 28 wherein a high pressure valve prevents the flow of said quantity of said fluid from said pressure chamber into said high pressure discharge passage until the pressure of said quantity of said fluid is at or above said pre-determined pressure.

30. A cryogenic tank assembly as claimed in claim 24 further comprising:
  a drive unit; and,
  a piston rod
    wherein said drive unit is a hydraulic drive comprising a hydraulic piston disposed within a hydraulic cylinder wherein a hydraulic fluid is deliverable to said drive unit causing a reciprocating motion of said hydraulic piston, wherein said reciprocating motion is transferable to said at least one piston through said piston rod.

31. A cryogenic tank assembly as claimed in claim 3, wherein said accumulator is mounted between said heater and said pump.

32. A cryogenic tank assembly as claimed in claim 31 wherein said high pressure discharge passage is joined directly to said entrance.

33. A cryogenic tank assembly as claimed in claim 31 wherein said exit is joined directly to said heater inlet.

34. A cryogenic tank assembly as claimed in claim 31, further comprising a casing assembly, said casing assembly integrating said heater, said accumulator and said pump.

35. A cryogenic tank assembly as claimed in claim 34, wherein said casing assembly comprises at least one tie rod.

36. A cryogenic tank assembly comprising:
  a. an outer jacket;
  b. a vessel generally surrounded by said outer jacket, said vessel defining a cryogen space, said cryogen space capable of storing a fluid at a cryogenic temperature and an initial pressure;
  c. a housing, said housing comprising a wall defining a housing space, said wall comprising a first end and a second end, said first end attached to said outer jacket and said second end extending into said cryogen space such that said housing space extends into said cryogen space,
  d. a pump comprising:
    i. an intake opening disposed in said cryogen space capable of receiving a quantity of said fluid from said cryogen space;
    ii. a pressurizing means capable of pressurizing said quantity of said fluid to a pre-determined pressure, said pre-determined pressure being greater than said initial pressure and said pressurizing means being in communication with said intake opening; and,
    iii. a high pressure discharge passage in communication with said pressurizing means for discharging said quantity of said fluid from said pressurizing means,
  e. an accumulator comprising:
    i. an entrance for receiving said quantity of said fluid from said high pressure discharge passage;
    ii. a storage volume in communication with said entrance; and, iii. an exit in communication with said storage volume for delivering said quantity of said fluid, wherein said accumulator is disposed within said cryogen space.

37. A cryogenic tank assembly as claimed in claim 36 further comprising a heater, said heater comprising:
  a. a heater inlet capable of receiving said quantity of said fluid from said exit; and,
  b. a delivery outlet capable of delivering said quantity of said fluid at a pre-determined temperature, said pre-determined temperature being greater than said cryogenic temperature.

38. A cryogenic tank assembly as claimed in claim 37 wherein said housing further comprises an outer wall generally surrounding said wall, whereby a thermal insulation space is defined between said wall and said outer wall such that said housing provides thermal insulation between said accumulator and said cryogen space.

39. A cryogenic tank assembly as claimed in claim 38 wherein said insulation space comprises an evacuated space.

40. A cryogenic tank assembly as claimed in claim 38 wherein said heater is also housed in said cryogen space and said thermal insulation space is capable of providing thermal insulation between said heater and said cryogen space.

41. A cryogenic tank assembly comprising:
  a. a vessel defining a cryogen space capable of storing a fluid at a cryogenic temperature and an initial pressure;
  b. an outer jacket surrounding said vessel defining:
    i. an assembly space; and,
    ii. an insulation space between said vessel and said outer jacket wherein said assembly space comprises said cryogen space and said insulation space;
  c. a pump comprising:
    i. an intake opening disposed in said cryogen space for receiving a quantity of said fluid from said cryogen space;
    ii. a pressurizing device capable of receiving said quantity of said fluid from said intake opening and pressurizing said quantity of said fluid to a pre-determined pressure, said pre-determined pressure being greater than said initial pressure; and,
    iii. a high pressure discharge passage in communication with said pressurizing device for discharging said quantity of said fluid from said pressurizing device,
  d. an accumulator comprising:
    i. an entrance for receiving said quantity of said fluid from said high pressure discharge passage;
    ii. a storage volume in communication with said entrance; and, iii. an exit in communication with said storage volume for delivering said quantity of said fluid,
wherein a percentage of said accumulator is disposed within said assembly space.

42. A cryogenic tank assembly as claimed in claim 41 wherein said percentage of said accumulator is disposed within said insulation space.

43. A cryogenic tank assembly as claimed in claim 41, further comprising a heater capable of receiving said quantity of said fluid through said exit, said heater comprising:
  a. a heater inlet; and,
  b. a delivery outlet capable of delivering said quantity of said fluid as a gas at a pre-determined temperature, said pre-determined temperature being greater than said cryogenic temperature.

44. A cryogenic tank assembly as claimed in claim 43 wherein a percentage of said heater is disposed within said assembly space.

45. A cryogenic tank assembly as claimed in claim 43 wherein said heater comprises a heating substance and at least one channel for housing said heating substance wherein said heating substance is capable of warming said cryogenic fluid such that said cryogenic fluid is converted to said gas.

46. A cryogenic tank assembly comprising:
  a. a vessel defining a cryogen space capable of storing a fluid at a cryogenic temperature and an initial pressure;

b. an outer jacket surrounding said vessel defining:
  i. an assembly space; and,
  ii. an insulation space between said vessel and said outer jacket; wherein said assembly space comprises said insulation space and said cryogen space,
c. a support wall comprising a first end and a second end, said first end attached to said outer jacket and said second end extending into said cryogen space, wherein said support wall defines a housing space within said cryogen space,
d. a barrier wall comprising a vessel end and a cryogen end, said vessel end attached to said vessel and said cryogen end extended into said cryogen space and attached to said second end, wherein said barrier wall defines a second insulation space between said support wall and said barrier wall,
e. a pump comprising:
  i. a compression cylinder comprising an intake end and a discharge end;
  ii. an end flange abutted against said intake end;
  iii. an intermediate flange abutted against said discharge end;
  iv. a reciprocating piston movably disposed within said compression cylinder, said reciprocating piston comprising an intake face and a discharge face;
  v. an intake chamber defined within said cylinder between said intake face and said end flange;
  vi. a pressure chamber defined within said cylinder between said discharge face and said intermediate flange;
  vii. an intake opening disposed within said cryogen space for receiving a quantity of said fluid from said cryogen space;
  viii. a intake check valve capable of allowing one-way flow of said fluid into said intake chamber from said intake opening wherein said intake check valve is disposed within said end flange;
  ix. a piston check valve disposed within said piston capable of allowing one-way flow of said fluid from said intake chamber into said pressure chamber; x. an accumulator check valve disposed within said intermediate flange capable of allowing one-way flow of said fluid from said pressure chamber into a high pressure discharge passage,
f. an accumulator fixed in said housing space said accumulator comprising:
  i. an entrance in communication with said high pressure discharge passage;
  ii. a coiled tube defining a storage volume, said storage volume in communication with said entrance; and,
  iii. an exit in communication with said storage volume for delivering said quantity of said fluid, wherein a percentage of said accumulator is disposed within said assembly space.

47. A method of storing a pressurized fluid comprising sequentially:
a. receiving a quantity of a fluid from a cryogen space at an initial pressure, said cryogen space defined by a vessel;
b. pressurizing said quantity of said fluid to within a pre-determined pressure range wherein said initial pressure is less than said predetermined pressure range; and,
c. storing said quantity of said fluid within an accumulator disposed within said cryogen space wherein said quantity of said fluid is readily available for delivery within said pre-determined pressure range and wherein there is no fluid communication from the accumulator to the cryogenic space.

48. A method of storing and delivering a gas comprising sequentially:
a. receiving a quantity of a fluid from a cryogen space at an initial pressure and an initial cryogenic temperature, said cryogen space defined by a vessel;
b. pressurizing said quantity of said fluid to within a pre-determined pressure range wherein said initial pressure less than said predetermined pressure range;
c. storing a percentage of said quantity of said fluid within an accumulator disposed within said cryogen space;
d. heating said quantity of said fluid and transforming it to said gas within a pre-determined temperature range; and,
e. delivering said gas within said pre-determined pressure range and within said pre-determined temperature range wherein said initial cryogenic temperature is less than said pre-determined temperature range and wherein there is no fluid communication from the accumulator to the cryogenic space.

49. A method of storing and delivering a pressurized gas as claimed in claim 48 wherein said pre-determined pressure range comprises pressures above the supercritical point of said fluid when said fluid is at said initial cryogenic temperature.

50. A method of storing and delivering a gas comprising sequentially:
a. receiving a quantity of a fluid from a cryogen space at an initial pressure and an initial cryogenic temperature, said cryogen space defined by a vessel, said vessel surrounded by an outer jacket that defines a tank assembly space, said tank assembly space comprising said cryogen space;
b. pressurizing said quantity of said fluid to within a pre-determined pressure range wherein said initial pressure less than said predetermined pressure range;
c. storing a percentage of said quantity of said fluid within an accumulator disposed within said tank assembly space;
d. heating said quantity of said fluid and transforming it to said gas within a pre-determined temperature range; and,
e. delivering said gas within said pre-determined pressure range and within said pre-determined temperature range wherein said initial cryogenic temperature is less than said pre-determined temperature range and wherein there is no fluid communication from the accumulator to the cryogenic space.

51. An apparatus as claimed in claim 1 wherein said fluid comprises at least one of methane, methanol, ethane, propane, hydrogen, oxygen or butane.

52. An apparatus as claimed in any one of claim 1 wherein said fluid comprises an element that is combustible as a gas.

53. A cryogenic tank assembly comprising:
a. a vessel defining a cryogen space capable of storing a fluid at a cryogenic temperature and an initial pressure;
b. a pump comprising:
  i. an intake opening disposed in said cryogen space for receiving a quantity of said fluid from said cryogen space;
  ii. a pressurizing device capable of pressurizing said quantity of said fluid to a pre-determined pressure, said pre-determined pressure being greater than said initial pressure and said pressurizing device being in communication with said intake opening; and, iii. a high pressure discharge passage in communication with said pressurizing device for discharging said quantity of said fluid from said pressurizing device,
c. a conduit comprising:
   i. an entrance for receiving said quantity of said fluid from said high pressure discharge passage;
   ii. a storage volume in communication with said entrance; and, iii. an exit in communication with said storage volume for delivering said quantity of said fluid,
d. a heater capable of receiving said quantity of said fluid through said exit, said heater comprising:
   i. a heater inlet; and, ii. a delivery outlet capable of delivering said quantity of said fluid as a gas at a pre-determined temperature, said predetermined temperature being greater than said cryogenic temperature, wherein a percentage of said heater is disposed within said cryogen space.

54. A cryogenic tank assembly as claimed in claim 53 further comprising a housing, said housing surrounding said percentage of said heater, said housing providing structural support to said heater.

55. A cryogenic tank assembly as claimed in claim 53, further comprising a housing defining a housing space, said housing comprising a first end and a second end, said first end attached to said vessel and said second end extending into said cryogen space such that a percentage of said housing space is defined within said cryogen space, wherein a second percentage of said heater is disposed within said housing space.

56. A cryogenic tank assembly as claimed in claim 55 wherein said second percentage of said heater is wholly within said cryogen space.

57. A cryogenic tank assembly as claimed in claim 53 wherein said exit is a distance from said entrance, said distance providing thermally insulation between said cryogen space and said exit.

58. A cryogenic tank assembly as claimed in claim 53 further comprising a housing, said housing surrounding said percentage of said heater disposed within said cryogen space, said housing providing thermal insulation between said percentage of said heater and said cryogen space.

59. A cryogenic tank assembly as claimed in claim 58 wherein said housing provides thermal insulation between said conduit and said cryogen space.

60. A cryogenic tank assembly as claimed in claim 58, wherein said housing comprises an inner wall defining a housing space and an outer wall surrounding said inner wall, whereby said outer wall defines a thermal insulation space between said inner wall and said outer wall, and said outer wall comprises an outer surface, and at least a portion of said outer surface faces said cryogen space, wherein:
a. said conduit; and,
b. said percentage of said heater disposed within said cryogen space are disposed within said housing space.

61. A cryogenic tank assembly as claimed in claim 53 wherein said heater comprises a heating substance and at least one channel for housing said heating substance wherein said heating substance is capable of warming said cryogenic fluid.

62. A cryogenic tank assembly as claimed in claim 61 wherein said heating substance is a heating fluid capable of being circulated through said at least one channel.

63. A cryogenic tank assembly as claimed in claim 62 wherein said gas is capable of being delivered through said delivery outlet for use as a fuel in an engine and said heating fluid is engine coolant.

64. A cryogenic tank assembly as claimed in claim 53 further comprising a drive unit capable of driving said pump wherein said drive unit is disposed outside of said cryogen space.

65. A cryogenic tank assembly as claimed in claim 64 further comprising a piston rod wherein said drive unit is in communication with said pump through said piston rod.

66. A cryogenic tank assembly as claimed in claim 53 wherein said conduit further comprises:
a. a sleeve, said sleeve defining an passage space within said conduit; and,
b. a storage vessel defining said storage volume wherein said storage volume is disposed in said passage space.

67. A cryogenic tank assembly as claimed in claim 66 wherein said storage vessel comprises at least one coiled tube.

68. A cryogenic tank assembly as claimed in claim 66 wherein said sleeve is a thermal insulator.

69. A cryogenic tank assembly comprising:
a. an outer jacket;
b. a vessel generally surrounded by said outer jacket, said vessel defining a cryogen space, said cryogen space capable of storing a fluid at a cryogenic temperature and an initial pressure;
c. a housing, said housing comprising a wall defining a housing space, said wall comprising a first end and a second end, said first end attached to said outer jacket and said second end extending into said cryogen space such that said housing space extends into said cryogen space,
d. a pump comprising:
   i. an intake opening disposed in said cryogen space capable of receiving a quantity of said fluid from said cryogen space;
   ii. a pressurizing means capable of pressurizing said quantity of said fluid to a pre-determined pressure, said pre-determined pressure being greater than said initial pressure and said pressurizing means being in communication with said intake opening; and,
   iii. a high pressure discharge passage in communication with said pressurizing means for discharging said quantity of said fluid from said pressurizing means,
e. a conduit comprising:
   i. an entrance for receiving said quantity of said fluid from said high pressure discharge passage;
   ii. a storage volume in communication with said entrance; and, iii. an exit in communication with said storage volume for delivering said quantity of said fluid,
f. a heater disposed within said cryogen space, said heater comprising:
   i. a heater inlet capable of receiving said quantity of said fluid from said exit; and,
   ii. a delivery outlet capable of delivering said quantity of said fluid at a pre-determined temperature, said pre-determined temperature being greater than said cryogenic temperature said conduit providing thermal insulation between said heater and said cryogen space.

70. A cryogenic tank assembly as claimed in claim 69 wherein said housing further comprises an outer wall generally surrounding said wall, whereby a thermal insulation space is defined between said wall and said outer wall such that said housing provides thermal insulation between said heater and said cryogen space.

71. A cryogenic tank assembly as claimed in claim 70 wherein said insulation space comprises an evacuated space.

72. A cryogenic tank assembly as claimed in claim 70 wherein said thermal insulation space has a conductivity of less than 15 W/m times·K.

73. A cryogenic tank assembly as claimed in claim 69, wherein said conduit further comprises an evacuated space surrounding said storage volume.

74. A cryogenic tank assembly comprising:
  a. a vessel defining a cryogen space capable of storing a fluid at a cryogenic temperature and an initial pressure;
  b. an outer jacket surrounding said vessel defining: i. an assembly space; and, ii. an insulation space between said vessel and said outer jacket; wherein said assembly space comprises said insulation space and said cryogen space,
  c. a support wall comprising a first end and a second end, said first end attached to said outer jacket and said second end extending into said cryogen space, wherein said support wall defines a housing space within said cryogen space,
  d. a barrier wall comprising a vessel end and a cryogen end, said vessel end attached to said vessel and said cryogen end extended into said cryogen space and attached to said second end, wherein said barrier wall defines a second insulation space between said support wall and said barrier wall,
  e. a pump comprising:
    i. a compression cylinder comprising an intake end and a discharge end;
    ii. an end flange abutted against said intake end;
    iii. an intermediate flange abutted against said discharge end;
    iv. a reciprocating piston movably disposed within said compression cylinder, said reciprocating piston comprising an intake face and a discharge face;
    v. an intake chamber defined within said cylinder between said intake face and said end flange;
    vi. a pressure chamber defined within said cylinder between said discharge face and said intermediate flange;
    vii. an intake opening disposed within said cryogen space for receiving a quantity of said fluid from said cryogen space;
    viii. a intake check valve capable of allowing one-way flow of said fluid into said intake chamber from said intake opening wherein said intake check valve is disposed within said end flange;
    ix. a piston check valve disposed within said piston capable of allowing one-way flow of said fluid from said intake chamber into said pressure chamber;
    x. an conduit check valve disposed within said intermediate flange capable of allowing one-way flow of said fluid from said pressure chamber into a high pressure discharge passage,
  f. an conduit fixed in said housing space said conduit comprising:
    i. an entrance in communication with said high pressure discharge passage;
    ii. a coiled tube defining a storage volume, said storage volume in communication with said entrance; and,
    iii. an exit in communication with said storage volume for delivering said quantity of said fluid,
  g. a heater, a percentage of said heater is disposed within said assembly space, said heater comprising
    i. a coiled pipe disposed within at least one heat bath channel, wherein said fluid is receivable into said coiled pipe from said exit, and
    ii. a heating fluid is capable of being circulated through said at least one heat bath channel such that said fluid is deliverable from said pipe at a temperature higher than said cryogenic temperature.

75. A method of storing and delivering a gas comprising sequentially:
  a. receiving a quantity of a fluid from a cryogen space at an initial pressure and an initial cryogenic temperature, said cryogen space defined by a vessel;
  b. pressurizing said quantity of said fluid to within a pre-determined pressure range wherein said initial pressure less than said pre-determined pressure range;
  c. delivering said quantity of said fluid to a heater thermally insulated from said cryogen space;
  d. heating said quantity of said fluid with said heater within said cryogen space and transforming it to said gas within a pre-determined temperature range; and,
  e. delivering said gas within said pre-determined pressure range and within said pre-determined temperature range wherein said initial cryogenic temperature is less than said pre-determined temperature range.

76. A method of storing and delivering a pressurized gas as claimed in claim 75 wherein said pre-determined pressure range comprises pressures above the supercritical point of said fluid when said fluid is at said initial cryogenic temperature.

77. A method of storing and delivering a gas comprising sequentially:
  a. receiving a quantity of a fluid from a cryogen space at an initial pressure and an initial cryogenic temperature, said cryogen space defined by a vessel, said vessel surrounded by an outer jacket that defines a tank assembly space, said tank assembly space comprising said cryogen space;
  b. pressurizing said quantity of said fluid to within a pre-determined pressure range wherein said initial pressure less than said pre-determined pressure range;
  c. delivering said quantity of said fluid to a heater disposed within said tank assembly space;
  d. heating said quantity of said fluid with said heater and transforming it to said gas within a pre-determined temperature range; and,
  e. delivering said gas within said pre-determined pressure range and within said pre-determined temperature range wherein said initial cryogenic temperature is less than said pre-determined temperature range.

* * * * *